Sept. 15, 1959     J. R. AUSTIN, SR     2,903,803
LOG HANDLING APPARATUS
Filed June 20, 1955     2 Sheets-Sheet 1

INVENTOR.
JOHN R. AUSTIN, SR.
BY
Horace B. Van Valkenburgh
ATTORNEY

Sept. 15, 1959  J. R. AUSTIN, SR  2,903,803
LOG HANDLING APPARATUS
Filed June 20, 1955  2 Sheets-Sheet 2

INVENTOR.
JOHN R. AUSTIN, SR.
BY
Horace B. Van Valkenburgh
ATTORNEY

United States Patent Office 2,903,803
Patented Sept. 15, 1959

2,903,803

LOG HANDLING APPARATUS

John R. Austin, Sr., Loveland, Colo.

Application June 20, 1955, Serial No. 516,617

2 Claims. (Cl. 37—117.5)

This invention relates to log handling apparatus, and more particularly to log handling apparatus which can be utilized to pick up, elevate and move a log from one position to another.

In lumbering operations, particularly where the logs have any substantial size, such as weighing several tons, the handling of logs is a problem of particular consequence. A log, of course, need not necessarily be an entire tree as felled, but may be a section of a tree. With logs of any substantial diameter, the loading of logs onto motor drawn trailers or onto railway cars for transportation requires a relatively large amount of power and also apparatus which may be shifted from place to place. When logs are loaded at a single place, as a railway loading station, they can be handled by a derrick. However, if the derrick is moved from one place to another, a separate vehicle drawn trailer is normally necessary and this involves both loading the derrick onto the trailer and unloading the derrick when the desired position is reached. Furthermore, when moving a derrick through the woods, the boom usually unduly complicates transportation, since it may strike trees or other obstructions, which thus must be carefully avoided. Also, the roads over which the log handling apparatus must move are often merely wide trails which have been roughed out by a bulldozer.

Among the objects of the present invention are to provide log handling apparatus which can be used to pick up, elevate and move logs without undue difficulty; to provide such log handling apparatus which maintains the log steady during elevation and movement; to provide such log handling apparatus which can be moved readily along rough roads or wide trails and in a preferred form can be utilized in making its own road and forother purposes; to provide such log handling apparatus which is relatively quick and effective in operation; and to provide such log handling apparatus which can be manufactured relatively economically.

The above objects of this invention may be accomplished by providing a tractor-like vehicle with a boom which is pivotally mounted thereon and which may be moved upwardly and downwardly, such as hydraulically. The forward end of the boom, which extends beyond the front of the vehicle, is provided with a blade which may be utilized in making a road for the tractor when logs are not being handled, the blade also engaging one side of a log and therefore maintaining the log in a steady position while being elevated or moved. Since the height to which logs are to be lifted in loading the same onto a motor drawn trailer, or onto a railway flat car, is not unduly great, it is sufficient that the boom be capable of being moved upwardly until the log is only some 10 or 12 feet above the ground. In addition, a device for engaging a side of the log opposite the blade is mounted forwardly of and above the blade, while suitable means, such as including a hydraulic cylinder mounted on the boom, is provided so as to support and move the log engaging device into and out of engagement with the log. The log engaging device may be a single pin, preferably pointed at the end, so as to bite into the log, although any other type of device which will engage the log and hold it securely against the blade may be used. Conveniently, the log engaging pin is mounted on the front end of a lever arm, which is pivoted on a bracket extending upwardly and slightly forwardly from the center of the blade, this lever arm extending forwardly to the log engaging pin and rearwardly to its connection with a hydraulic cylinder mounted on the boom. Thus, the log engaging pin or other log engaging device, may be swung in an arc from a position in which the largest diameter of log to be handled, such as seven feet, will be clear, to a position adjacent the lower edge of the blade, so that a log of any diameter up to the maximum may be securely clamped against the blade. A suitable boom, which includes a boom arm at each side of a tractor or similar vehicle, together with links and hydraulic cylinders for actuating the boom, may be constructed in a manner similar to that disclosed in my United States Patent No. 2,696,314, granted December 7, 1954.

Additional objects of this invention and the novel features thereof will become apparent from the following description, taken in connection with the accompanying drawings, in which.

Figure 1:
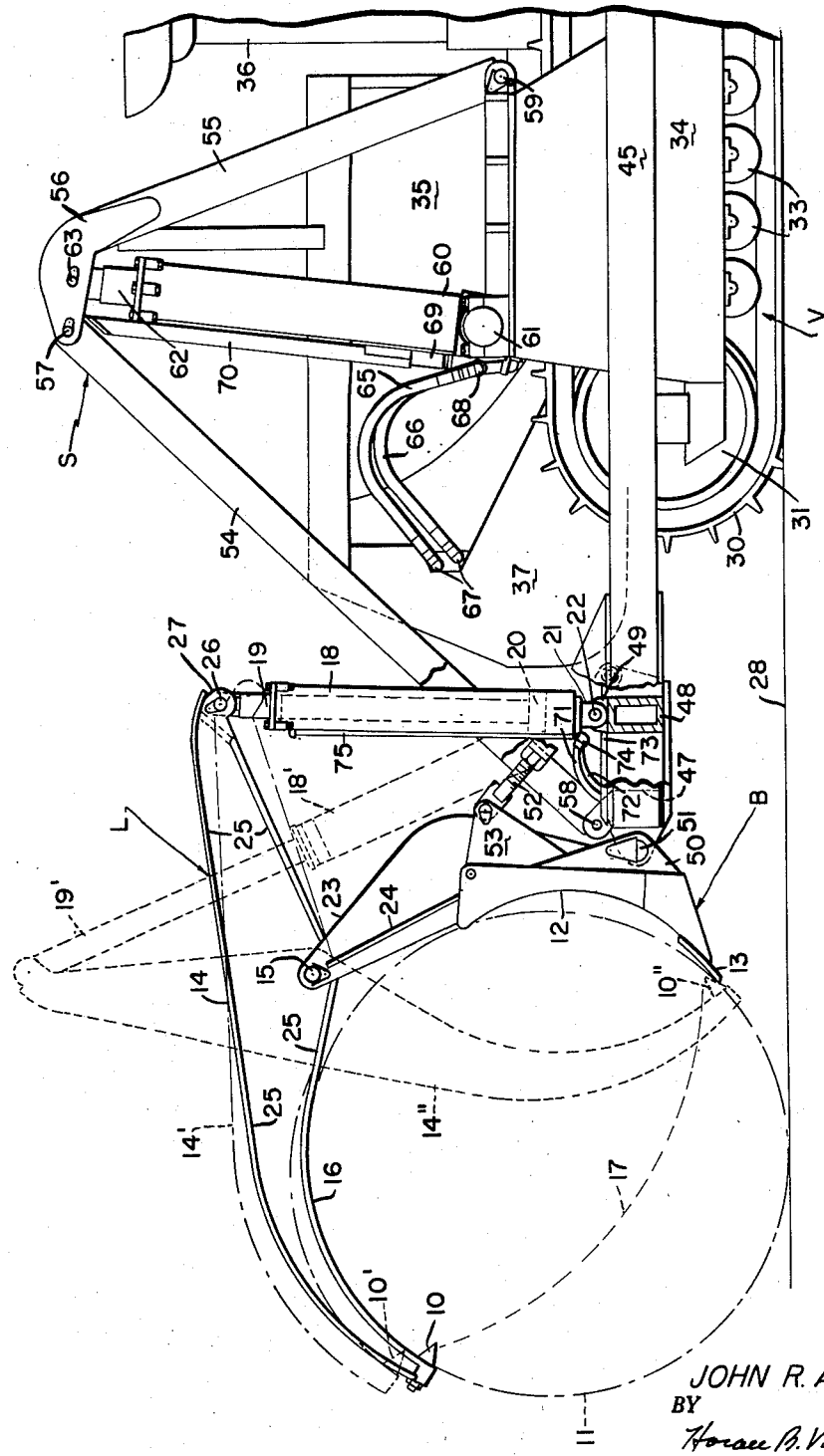
Fig. 1 is a side elevation of log handling apparatus constructed in accordance with this invention.

As illustrated in the drawings, log handling apparatus constructed in accordance with this invention may comprise a tractor-like vehicle V, on which is mounted a support S which is movable to various vertical positions, with a generally upright, transversely extending blade B being mounted on the front end of the support S. Log engaging means L is also mounted on the support S, or a part associated therewith, such as blade B, the log engaging means including a log engaging device 10, such as a pin having a conical point at the lower end so as to bite into a log 11, which is clamped between the pin 10 and the blade B. Blade B is preferably provided with a front surface 12 which is concave upwardly and downwardly, and also at the lower end with a scraper blade 13, formed of or provided along its lower edge with sufficiently hard and tough material to withstand usage of the blade B as a bulldozer blade. The pin 10 is mounted at the forward end of a lever arm 14 which is pivoted on a pin 15, conveniently disposed above and slightly forwardly of the upper edge of the blade B, the underside 16 of the front portion of the lever arm 14 preferably being concave, as on a sufficient radius of curvature that a log of the maximum diameter may be accommodated. The length of the front portion of arm 14, or the distance between log engaging pin 10 and pivot pin 15, is preferably such that the pin 10, as in Fig. 1, may be pushed upwardly to the position 10' or downwardly to the position 10'', thus swinging along the dotted arc 17, with the arm 14 assuming corresponding positions 14' and 14'', respectively. Preferably at its lower point 10'', the pin is adjacent the lower edge of the blade B, so that any log engaged by the pin 10 will be pushed into the blade B. Also, the highest position 10' is preferably sufficiently high that the support S may be raised and then lowered and the pin 10 will clear the top of a log of maximum diameter until the near side is engaged by the blade B. Of course, after the arm 14 and pin 10 have been placed over the log in the respective positions 10' and 14' of Fig. 1, the pin 10 may be moved into the log, as to the position 10. Such movement of the pin 10 and arm 14 may be produced by a double-acting hydraulic cylinder 18 having a piston rod 19 extending thereinto, the piston rod 19 being conventionally provided with a piston 20 at its lower end and disposed within the cylinder 18. At its lower end, the cylinder 18 may be provided with an ear 21 pivoted on a pin 22 to accommodate the pivotal movement of the cylinder, such as to position 18′ as the log engaging pin 10 and arm 14 are moved between the various positions shown in Fig. 1 and other positions intermediate thereto. As will be evident, when the log pin 10 is moved to the position 10″, the piston rod 19 will have moved out of the cylinder and also around to the position 19′.

Conveniently, the pivot pin 15 for arm 14 may be supported between a pair of brackets 23, which may be cut to a suitable shape and welded to the rear side of the blade B, also being reinforced by laterally extending gusset plates 24. As will be evident, any other suitable type of support for the pin 15 may be utilized, as well as any other desired manner of constructing arm 14, which may be cast steel or fabricated from plate cut to shape and reinforcing edges 25 welded thereto. The upper end of piston rod 19 may be pivotally connected to the rear end of arm 14 by a pin 26, extending between the two sides of a yoke 27 provided at the rear end of arm 14 for that purpose.

Figure 3:
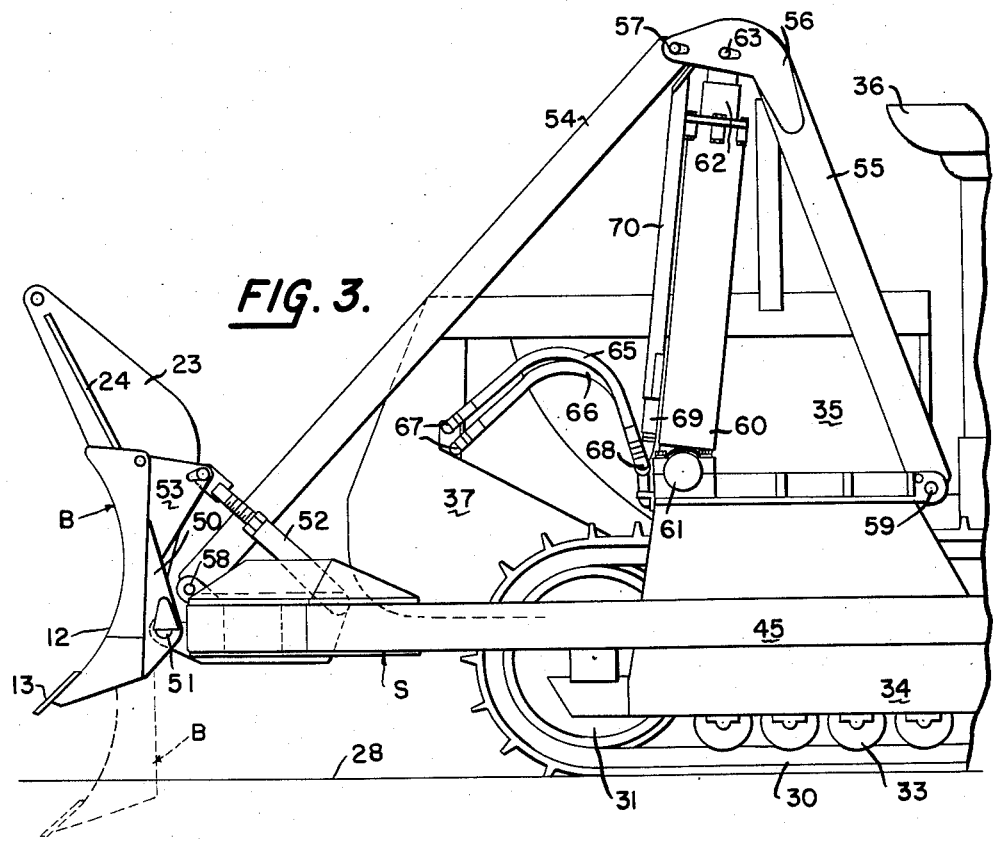
Fig. 3 is a side elevation of the apparatus of Fig. 1, with the log engaging means removed so that the blade may be utilized for making roads, or for other purposes similar to those for which a bulldozer is used.

Lever arm pin 15 and cylinder pin 22 each preferably may be removed, so that the arm 14 and cylinder 18 may in turn be removed, thus leaving the area in front of the blade B clear so that the blade B may be used for bulldozing and similar purposes, as by lowering the blade B into the ground 28, as in Fig. 3, although removal of arm 14 and cylinder 18 is normally deirable only when the blade B is to be pushed into a bank or a pile of dirt, gravel, earth or the like, which is sufficiently high that the possibility of ramming arm 14 into the same is present.

The vehicle V is illustrated as a crawler type tractor, although other vehicles, as hereinafter described, may be utilized. Thus, when a crawler type tractor, the vehicle V may be provided at each side with a segmented track 30, each of which passes around an idler wheel 31 at one end and a drive sprocket 32 at the opposite end, the vehicle being supported on each of the tracks 30 by a plurality of rollers 33, mounted on the underside of a side frame 34, in turn mounted on the main frame of the tractor. The tractor may also be provided with an engine 35 and a cab 36 in a conventional manner, with a protective housing 37 and 38, at the front and rear, respectively, and formed of sheet or plate of a suitable thickness to minimize damage to other parts. In addition, at the rear end, the tractor may be provided with a cable winch 39 so that the tractor may be utilized for each of the three principal machine requirements of a logging camp, i.e., loading logs, bulldozing, such as in clearing roads or stumps, and cable dragging, such as in clearing stumps, pulling logs to more convenient locations, and the like.

The vehicle which is used is not necessarily a crawler type tractor, since it may be a wheel type tractor, such as disclosed in my aforesaid United States Patent No. 2,696,314. Also, the term "tractor-type vehicle," as ued herein, is not to be construed as limited to a tractor, either crawler type or wheel, but to include also other types of vehicles and other types of equipment, such as a car, whether self-propelled or not and moving on a track, or a carriage mounted on a track car, or any other type of vehicle or movable support.

The blade support S may be constructed in any desired manner, such as in the manner disclosed in my aforesaid United States Patent No. 2,696,314. Thus, a boom arm 45 may be mounted at each side of the tractor, with the rear end of each boom arm pivoted on a pin 46, mounted at the rear side frame 34. At their forward ends, the boom arms 45 may be connected by a front beam 47, while a beam 48, such as a box beam, may extend between the boom arms adjacent the front end thereof to provide a support for an ear 49, in which pin 22 for hydraulic cylinder 18 is mounted. The blade B may be suitably reinforced and provided with two pairs of spaced brackets 50 adjacent the opposite ends thereof, the lower end of each pair of brackets 50 being pivotally connected by a pin 51 with the front end of the respective boom arm 45. In addition, a turnbuckle 52, or other suitable device, such as a hydraulic cylinder, for adjusting the position of blade B about blade pins 51, may be pivotally connected to and extend between a boom arm 45 adjacent the front end thereof and the rear of an upper pair of blade brackets 53. As will be evident, the adjustable mounting of blade B on the front end of the boom arms may be utilized in changing the angle of the position of the blade, in accordance with the type of operation to be accomplished.

The boom arms 45 may be moved upwardly and downwardly by any suitable mechanism, such as a front link 54 and a rear link 55, the rear link being provided with a knee 56 at its normally upper front end, and the normal rear, upper end of the front link 54 being pivotally connected to the knee, as by a pin 57. The normally lower, front end of each front link 54 may be pivotally connected to the respective boom arm, as by a pin 58, while the normally lower, rear end of each rear link 55 may be pivoted to the side frame of the tractor, as by a pin 59. A double acting hydraulic cylinder 60 on each side may be pivoted at its lower end by a bearing 61 on the tractor side frame 34, each cylinder being provided with a piston rod 62, to the lower end of which may be attached a piston, not shown, disposed within the cylinder, while the upper end of each piston rod 62 may be pivotally connected, as by a pin 63, to a knee 56. Each of the links 54 and 55 is conveniently fabricated from plate, cut to shape and welded together, while the knee 56 is preferably integral with the rear link 55, conveniently being also formed of plate cut to shape and welded thereto. Suitable hydraulic controls for the log cylinder 18 and the link cylinders 60 may be provided on the tractor, such as including valves for controlling the flow of hydraulic fluid to and from the various cylinders, fluid under pressure being conveniently supplied from a pump driven by engine 35, such a pump being conventional and therefore not shown. Return flow from the cylinders may be led to a conventional hydraulic reservoir, installed in any suitable position and connected with the pump intake. The control valves may also be conventional, therefore not being shown, while conventional control levers may be installed in the cab 36 for use by the operator. Hydraulic fluid may be supplied to and from the upper and lower ends of the link cylinders 60 in any suitable manner, as by flexible hoses 65 and 66, respectively, which lead from connections 67 to a special hydraulic joint 68, which permits the ends of the hoses 65 and 66 to turn relative to cylinder 60 as it moves to various positions, such as between the position of Fig. 1 and the position of Fig. 2. From the joint 68, a suitable connection leads to the bottom of cylinder 60, while a pipe 69 may extend to the upper end of cylinder 60, pipe 69 being enclosed, if desired, by a piston rod guard 70, which may be constructed in the manner disclosed and claimed in my copending application Serial No. 440,643, filed July 1, 1954, now Patent No. 2,764,303.

Figure 2:
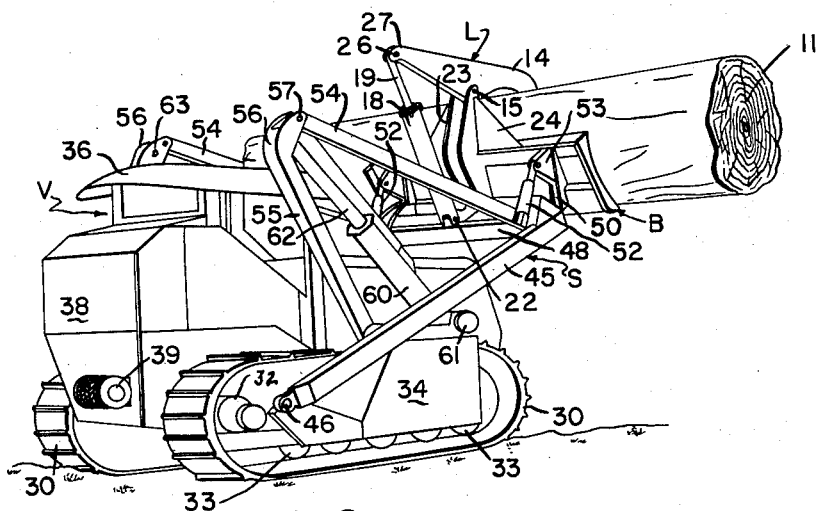
Fig. 2 is a perspective view of the apparatus of Fig. 1, carrying a log ready to be placed at an elevated position.

A controlled flow of hydraulic fluid may be supplied to and from the upper and lower ends of the log engaging device cylinder 18 in a suitable manner, such as by hoses 71 and 72, leading from pipes extending along a boom arm 45, such as pipe 73 of Fig. 1, and connected at their opposite ends to a hydraulic joint 74 from which connection is made to the interior of cylinder 18 at the bottom and also to a pipe 75 which connects with the interior of cylinder 18 at the top. As will be evident, the valves controlling the flow of hydraulic fluid to cylinder 18 and also the cylinders 60 may be conventional in operation, such as automatically draining fluid from one end when fluid under pressure is supplied to the opposite end of the cylinder. As described previously, by raising piston 20 in cylinder 18 through appropriate control of the hydraulic fluid, the log engaging device, such as pin 10, may be moved downwardly to any desired position along the arm 17 of Fig. 1, while retraction of piston rod 19 by lowering piston 20 may be utilized to move the pin 10 back to any desired upper position. Similarly, hydraulic fluid pressure supplied to the lower end of each of the cylinders 60 will elevate piston rod 62, causing knee 56 and rear link 55 to move upwardly and rearwardly and front link 54 to be elevated, thereby pulling the boom arms 45 upwardly. The link and cylinder arrangement shown is capable of moving the boom arms directly overhead, i.e., to a vertical position, although this position may not ordinarily be used in picking up or depositing logs. However, the height to which the logs may be easily lifted, such as illustrated in Fig. 2, is a distinct asset of apparatus constructed in accordance with this invention.

As will be evident, during such lifting, the log 11 is engaged along one side for a substantial distance of its length by the blade B and the log is maintained against the blade by the pressure of the log engaging device, such as pin 10. Thus, after the log is picked up, the vehicle, such as the crawler type tractor shown, may be moved forwardly or backwardly or swung about without any undue tendency to disturb the position of the log until it is released. Of course, as the log is lifted, pressure of hydraulic fluid to the bottom of cylinder 18 should be maintained, to maintain clamping pressure on the log. After the desired position for release is reached, all that is necessary to release the log is merely to retract the piston rod 19 of cylinder 18, so that the log engaging pin 10 will be moved out from the log, whereupon the log will be free to slide off the lower edge of blade B. The concavity of blade B is an advantage, since logs of the maximum, or nearly maximum diameter, will be engaged primarily along two longitudinal lines along the log, i.e., at the upper and lower edges of the blade B, while smaller logs, having a diameter less than the radius of curvature of the blade B, whose weight is usually less and whose steadiness of movement is therefore not such a problem, will be held securely against the curvature of blade B and the preferred curved underside 16 of arm 14 will provide another point of contact. For much smaller logs, the pin 10 will engage the same at a point below the horizontal center line, thus additionally supporting the log.

As will be evident from Fig. 3 and has been indicated previously, the arm 14 and cylinder 18 may be removed merely by removing pins 15 and 22, so that the forward extension of the arm 14 will not interfere with bulldozing operations and the like. Of course, for surface operations, as when the blade is not being run into a bank, the cylinder 18 and arm 14 may merely be left in position, but the front end of the arm 14 raised to the upper position 14' of Fig. 1.

As will be evident, log handling apparatus constructed in accordance with this invention fulfills to a marked degree the requirements and objects hereinbefore set forth. The use of a log engaging device which is movable toward and away from and is used in combination with a transversely extending blade, permits logs to be picked up, elevated and/or moved about with ease and rapidity. Particularly when the log engaging device is actuated by a hydraulic cylinder, engagement and disengagement with the log may be accomplished in a single quick operation. Furthermore, by pivotally supporting the log engaging device at a point above and preferably slightly forwardly of the upper edge of the blade, logs of any diameter up to the maximum may be handled with the same ease and facility. Particularly when the support for the blade is pivotally mounted adjacent the rear of the tractor, the weight of the log when lifted is counterbalanced by the weight of the tractor, so that relatively large logs may be lifted without undue strain on parts. As has been pointed out, the same blade which cooperates with the log engaging device in lifting logs may also be used for bulldozing and similar purposes.

Although the vehicle on which the log handling apparatus of this invention may be installed and has been illustrated and described as a crawler type tractor, it will be understood, as pointed out hereinbefore, that other types of vehicles and even equipment which would not ordinarily be considered to be a propelled vehicle, may be utilized. In addition, any other desired type of support for raising and lowering the blade and moving the log engaging device may be utilized, while numerous changes may be made in the various parts and the operating elements. Thus, although possibly detracting somewhat from the ease and rapidity of handling, cable arrangements may be substituted for the hydraulic cylinders. Also, the pivot bracket for arm 14 or the equivalent thereof may be mounted on the blade support rather than on the blade itself. Of course, the log engaging device need not be moved arcuately toward and away from the blade, since any other suitable type of motion may be provided.

It will thus be understood that other embodiments of this invention may exist and numerous other changes may be made therein, in addition to those described or indicated, without departing from the spirit and scope of this invention.

What is claimed is:

1. In log handling apparatus, including a tractor like vehicle, the combination of a blade extending transversely relative to the normal direction of movement of said vehicle; a movable support for said blade for moving said blade upwardly and downwardly and including a boom pivotally connected to said vehicle adjacent the end thereof opposite said blade, a front link pivotally connected at its front end to said boom adjacent said blade, a rear link pivotally connected to said vehicle at one end and at the opposite end to the rear end of said front link, and a hydraulic cylinder acting between said vehicle and said links adjacent the pivotal connection therebetween; a device for engaging a log at a point on said log generally opposite said blade; and means operatively associated with said blade for supporting said log engaging device and for moving said log engaging device toward and away from said blade.

2. In log handling apparatus, including a tractor having side frames and a crawler track associated with each side frame, the combination of a generally upright blade extending transversely relative to the normal direction of movement of said tractor; a movable support for said blade including a boom arm at each side of said tractor and extending forwardly thereof, the rear end of each boom arm being pivoted on a side frame and said blade being mounted on the front ends of said boom arms; a front link at each side and pivoted at its lower front end to a boom arm; a rear link at each side and pivoted at its lower rear end on a side frame, each said rear link having a knee at its upper end and said knee being pivoted to the upper rear end of the respective front link; a double acting hydraulic cylinder and piston rod pivotally mounted between each said knee and the respective side frame, at a point forwardly of the lower end of the respective rear link; a beam extending between said boom arms adjacent the forward ends thereof; a bracket extending upwardly and forwardly from the upper edge of said blade at approximately the center of said blade; an arm supported on and extending forwardly and rearwardly from the upper end of said bracket, the front portion of said arm having a length substantially equivalent to the distance between the upper end of said bracket and the lower edge of said blade and the front portion of said arm being concave on the underside, the rear portion of said arm being shorter than the front portion thereof; a removable, transversely extending pin pivotally connecting said arm to the upper end of said bracket; a log engaging device mounted at the front end of said arm, said device having a downwardly extending, conical point; a double acting hydraulic cylinder disposed rearwardly of said bracket, said cylinder having a piston rod pivotally connected to the rear end of said arm; and a second, removable, transverse pin pivotally connecting the lower end of said cylinder to said beam.

References Cited in the file of this patent

UNITED STATES PATENTS

| | | |
|---|---|---|
| 2,326,338 | Drott et al. | Aug. 10, 1943 |
| 2,418,251 | Drott | Apr. 1, 1947 |
| 2,583,079 | Baker | Jan. 22, 1952 |
| 2,624,132 | Henry | Jan. 6, 1953 |
| 2,656,059 | Troyer | Oct. 20, 1953 |
| 2,717,704 | Pilch | Sept. 13, 1955 |
| 2,776,768 | Carlson | Jan. 8, 1957 |